Oct. 27, 1964 W. F. THOMA 3,153,952
INDEXING MECHANISM
Filed Aug. 17, 1962 3 Sheets-Sheet 1
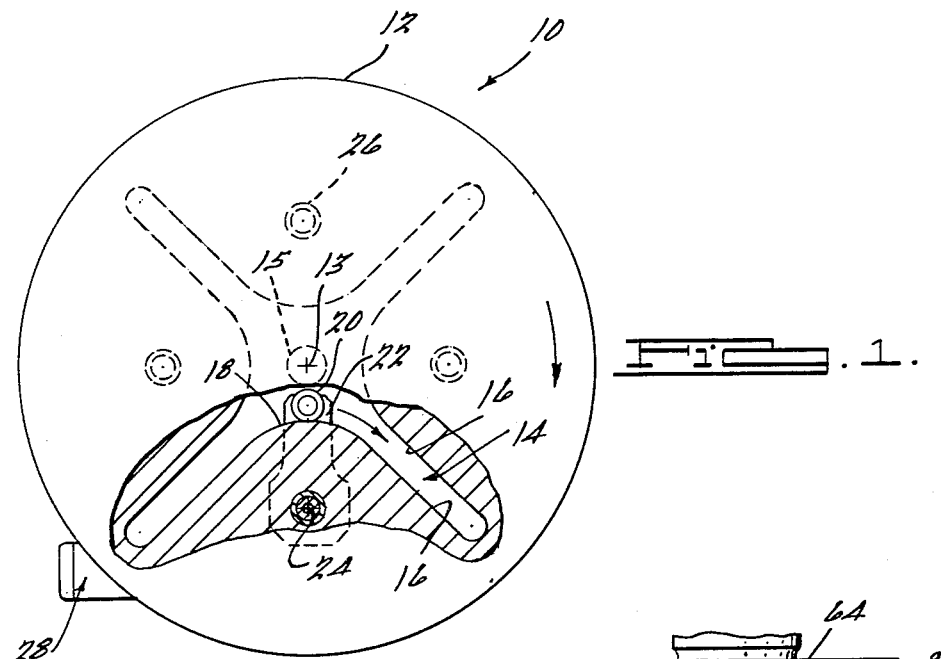
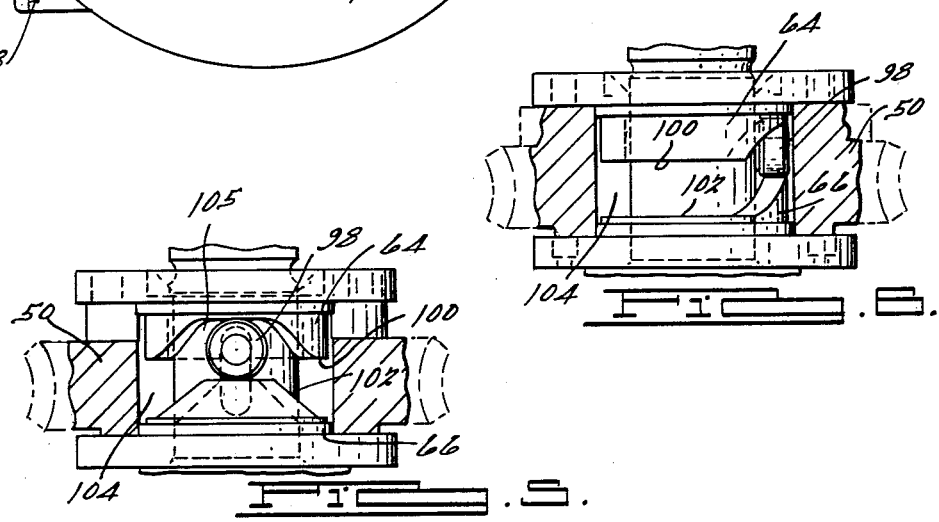
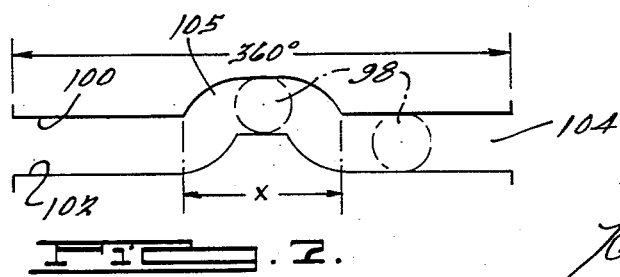
INVENTOR.
Willard F. Thoma.
BY
Harness, Dickey & Pierce
ATTORNEYS.

Oct. 27, 1964 W. F. THOMA 3,153,952
INDEXING MECHANISM
Filed Aug. 17, 1962 3 Sheets-Sheet 3
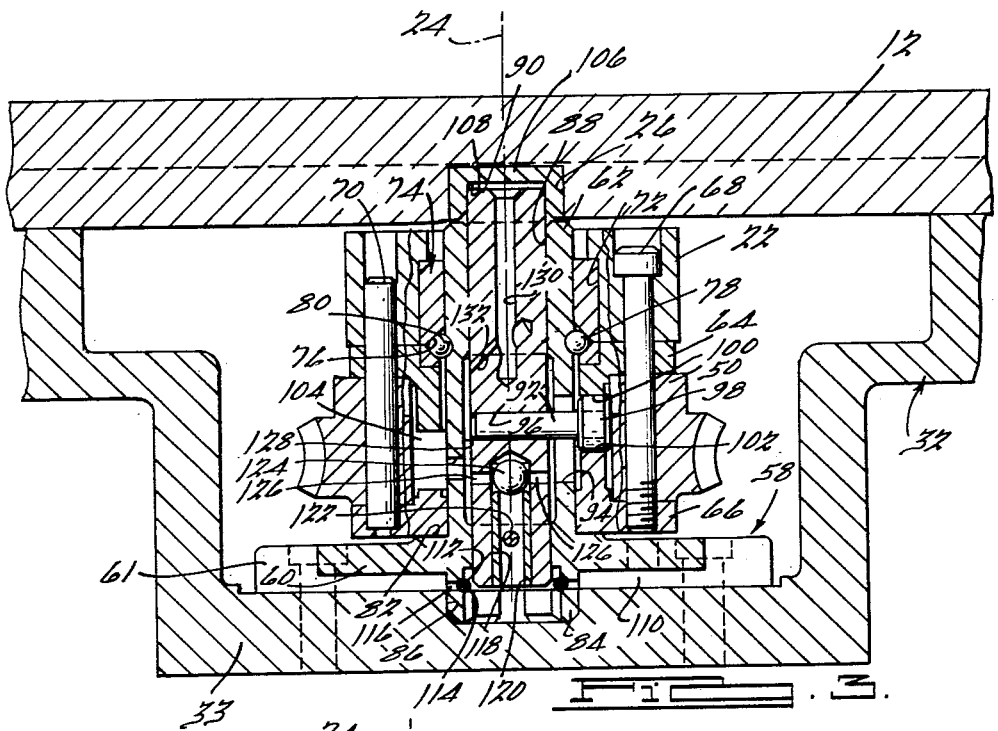
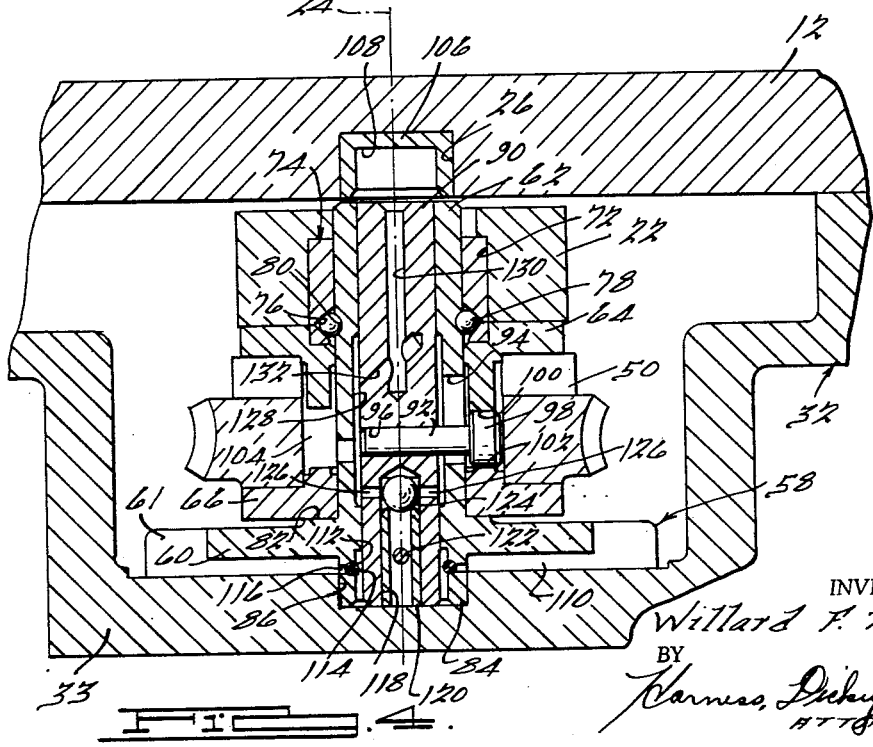
INVENTOR.
Willard F. Thoma
BY
Harness, Dickey & Pierce
ATTORNEYS.

United States Patent Office 3,153,952
Patented Oct. 27, 1964

3,153,952
INDEXING MECHANISM
Willard F. Thoma, 545 Pear Tree, Grosse Pointe, Mich.
Filed Aug. 17, 1962, Ser. No. 217,633
15 Claims. (Cl. 74—822)

This invention relates to indexing mechanisms and more particularly to an indexing device for indexing and accurately positioning objects through successive work stations.

While the teachings of this invention have been exemplified by a mechanism utilized for indexing and positioning a plurality of workpieces at successive work stations, it should be understood that the concepts presented herein are not restricted to that particular application.

In a device for performing a succession of work operations on different workpieces, the means for automatically indexing and positioning the different workpieces must be capable of repetitively providing accurate and exact locations. In such a device it is also desirable that the positional accuracy be readily and accurately determined. Also in such a device it is desirable that any inaccuracy due to wear, etc., be capable of correction by the simple replacement of relatively inexpensive parts rather than by elaborate machining, and/or replacement of expensive parts.

Therefore, it is an object of this invention to provide an indexing mechanism having accurate means for positioning the work at its various work stations.

It is an object of this invention to provide an indexing mechanism having the means for accurately positioning different objects at successive work stations, which means are easily and accurately checked for positional accuracy.

It is another object of this invention to provide an indexing mechanism having positioning means for accurately positioning different objects through a succession of work stations, which means are relatively easy to check and correct for positional inaccuracies due to wear, etc.

The particular construction of indexing mechanisms usually will vary in accordance with the particular task to which it is assigned. As a result, according to current practice, a substantially new indexing mechanism is laid out for each particular application requiring therefore many changes in dimension, etc., of the various parts. In the indexing mechanism of this invention a construction is provided which lends itself to many different types of applications with either little or no changes to be made in the construction of the parts. This allows for the component parts to be made in considerable quantities permitting thereby cost savings and also allows for the replacement of parts at a considerable saving to the operator. It is an object of this invention to provide an indexing mechanism having a construction which is readily adaptable with little or no changes to a variety of applications.

Other objects, features, and advantages of the present invention will become apparent from the subsequent description and the appended claims, taken in conjunction with the accompanying drawings, in which:

FIGURE 1 is a top elevational view, with some parts shown broken away, of a mechanism embodying the features of this invention;

FIGURE 3 is a side elevational sectional view of the mechanism shown in FIGURE 2 taken substantially along the line 3—3 in FIGURE 2 and depicting the mechanism in a locked condition;

FIGURE 4 is a side elevational view similar to that of FIGURE 3 depicting the mechanism in an unlocked condition;

FIGURE 5 is a fragmentary view, with some parts shown broken away and others shown in section, depicting the cam locking structure of the mechanism shown in FIGURES 1–4;

FIGURE 6 is a view similar to that of FIGURE 5 taken substantially at right angles to the view of FIGURE 5; and FIGURE 7 is a development showing the upper and lower cam surfaces.

Figure 2:
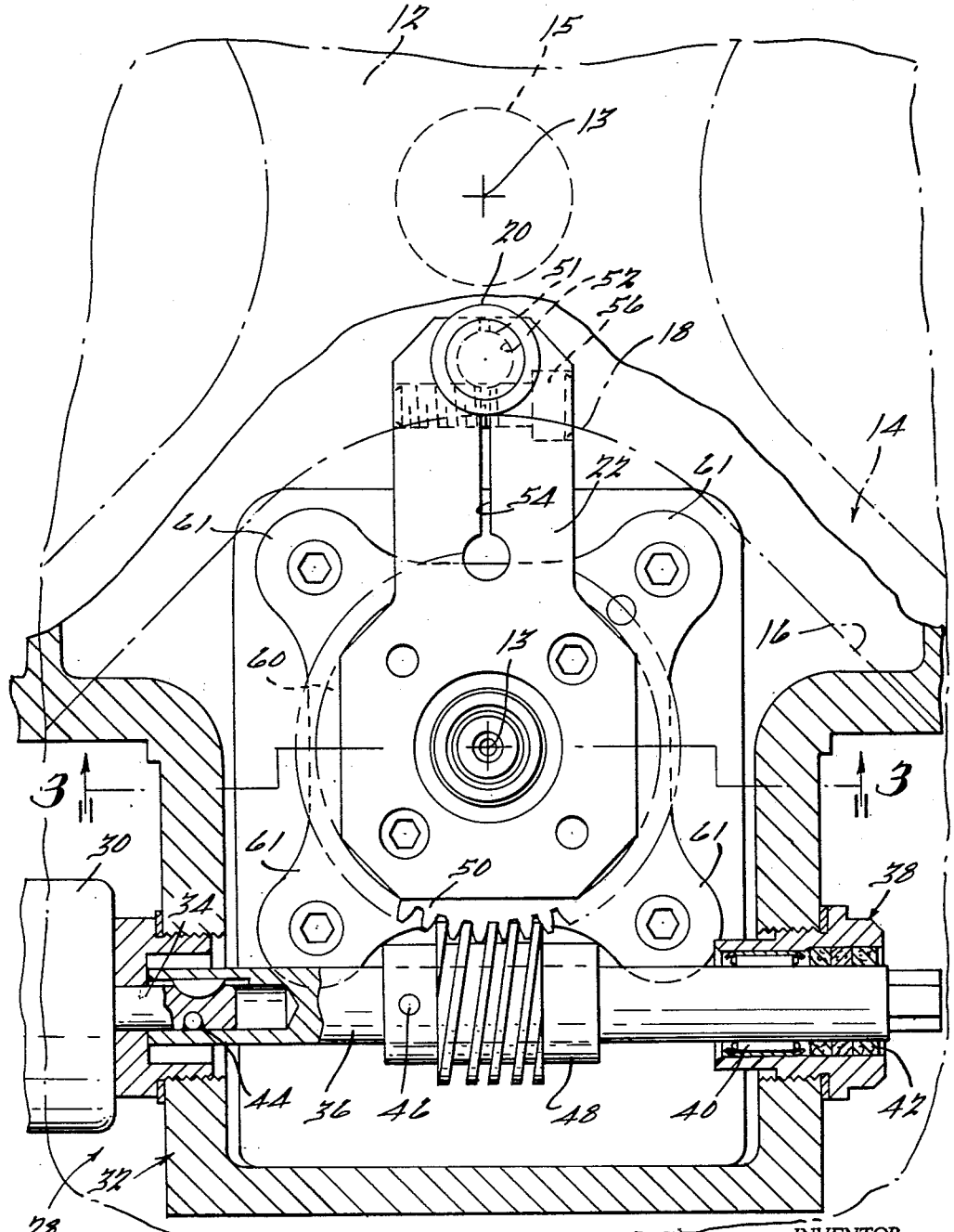
FIGURE 2 is a blown-up fragmentary top elevational view of a portion of the mechanism in FIGURE 1.

Looking now to FIGURE 1, an indexing mechanism embodying the features of this invention is generally indicated by the numeral 10 and has a generally circularly shaped Geneva plate 12 which is secured by means, generally indicated by the numeral 15, for rotation about an axis 13. The indexing mechanism shown in FIGURE 1 is designed for four stations and hence the Geneva plate 12 is provided on its bottom surface with four radially outwardly extending slots 14 having straight side portions 16 with adjacent ones of the straight side portions 16 of consecutive slots 14 being interconnected at their radially innermost ends by an arcuate portion 18 defining a portion of a circle. A drive roller 20 is rotatably secured to the end of a drive arm 22 which is in turn secured for rotation about an axis 24. The distance between the axis 24 and the outer radial surface of the roller 20 is substantially equal to the radius of the arcuate portion 18. Thus, looking at FIGURE 1, as the drive arm 22 is rotated about the axis 24 in a clockwise direction (as indicated by the arrow) the roller 20 is moved around the arcuate surface 18 and into contact with the straight surface portions 16 in one of the slots 14 such that the Geneva plate 12 is rotated about its axis 13 in a clockwise direction (as indicated by the arrow).

For each revolution of the roller 20 about the axis 24, the Geneva plate 12 is radially indexed approximately 90° (i.e. since four stations are used) with motion being imparted thereto while the roller 20 is in contact with the straight side portions 16. Motion of the plate 12 is substantially stopped as the roller 20 engages the arcuate surface 18. As the roller 20 contacts the arcuate surface 18, it tends to apply a braking force to the Geneva plate 12. While other types of motion could have been used, a true Geneva type motion was selected since it provides for smooth starting and stopping and affords the speeds required for many indexing operations. By virtue of the Geneva motion, the Geneva plate 12 has a minimum angular velocity as the roller 20 first leaves the arcuate surface 18 and begins to engage the straight portion 16 and increases in velocity to a maximum when the roller 20 is in a position substantially 180° relative to the position shown in FIGURE 1. After this latter position is reached the Geneva plate 12 is decelerated and is gradually stopped as the roller 20 begins its engagement with the arcuate surface 18 again. Thus the Geneva plate 12 is moved to its preselected position at each station while the roller 20 is in contact with the straight portions 16 and is stopped at this position while the roller 20 contacts the arcuate surface 18.

While only four stations are shown, any number of stations could be employed. The system is equally applicable to an inside or outside Geneva and can be readily adapted to a Geneva system in which the Geneva plate has a plurality of slots extending radially inwardly from the periphery of the Geneva plate (as exemplified by my copending application No. 86,948, filed on February 3, 1961).

As will be presently seen, in order to accurately position and to further lock the Geneva plate 12 at its various positions during those times when the roller 20 is in engagement with the arcuate surface 18 (i.e. the Geneva plate 12 is motionless), four equally radially spaced locating and locking bores 26 are provided on the bottom surface of the Geneva plate 12. The locking bores 26 have their centers substantially disposed on a circle having its center on the central axis 13 of the Geneva plate 12 and having a radius substantially equal to the distance between the axis 13 and the axis 24. The bores 26 are spaced such that their centers are substantially coincident with the axis 24 when the roller 20 is engaged with any one of the arcuate portions 18 of the grooves 14.

The drive arm 22 is driven by a drive means 28 which can be seen more clearly in FIGURE 2. The drive means 28 includes a drive motor 30 (only partially shown) which can be either electrically, pneumatically or hydraulically driven by means well known in the art, which motor 30 is fixedly secured to a wall of an enclosed housing 32 with an output shaft 34 extending outwardly therefrom and into the housing 32 and connected by a pin 44 to one end of a drive shaft 36 which has its opposite end journaled in a journal nut assembly 38 disposed in an opposite wall of the housing 32. The journal nut assembly 38 has a needle bearing assembly 40 disposed about the shaft 36 and is sealed by means of seals 42. The outer bearing and the thrust bearing of the motor 30 are used to react thrust loads and bearing loads at the one end of the drive shaft 36 thereby precluding the need for additional bearings at that end. A pin 46 rotatably secures a worm gear 48 to the shaft 36. Thus as the motor means 30 is actuated to cause rotation of the shaft 34, the drive shaft 36 in turn causes rotation of the worm gear 48. The housing 32 is closed at its upper end by the bottom surface of the Geneva plate 12 and thus defines a chamber for holding oil which is used in a manner to be seen.

Secured to the drive arm 22, by means to be presently seen, for rotation about the axis 13 is a worm wheel 50 having a plurality of teeth disposed radially about its periphery for engagement with the teeth of the worm gear 48. Thus, as the worm gear 48 is rotated, the worm wheel 50 is rotated about the axis 13 causing rotation thereabout of the drive arm 22 and the drive roller 20, thereby indexing the Geneva plate 12. Actuation of the motor means 30 can be provided to be continuous whereby the total dwell time or time at which the Geneva plate 12 is at rest will be that time during which the roller 20 is moving along one of the arcuate surfaces 18; alternatively, the operation of the motor means 30 could be provided to be intermittent whereby actuation of the motor 30 could be stopped with the roller 20 in engagement with the arcuate surface 18, thereby increasing the time during which the Geneva plate 12 is at rest.

The drive roller 20 is rotatably secured to a pin 51 which, in turn, is clamped within a bore 52 located at the outer end of the drive arm 22. The outer end of the drive arm 22 is split in two portions by means of a groove 54 which extends through the bore 52 such that, as a bolt member 56 connecting the two portions together is tightened, the surface of the bore 52 tightly clamps the pin 51.

Looking now to FIGURE 3, a center post member 58 is secured to the bottom portion 33 of the housing 32 at each of four radial arms 61 of a lower flange portion 60 and has extending upwardly therefrom and along the axis 24 a generally circularly shaped hollow post portion 62. Rotatably disposed about the post portion 62 is an assembly comprising the drive arm 22, an upper cam member 64, the worm wheel 50, and a lower cam member 66 which are all secured together by a plurality of bolts 68 and dowel pins 70. The drive member 22 and the upper cam member 64 define a radially extending inner recess 72 for housing a bearing assembly generally indicated by numeral 74. The bearing assembly 74 comprises a pair of annular bearing shells defining an annular groove 76 for holding a plurality of ball bearings 78, which are matably disposed within an annular groove 80 in the outer periphery of the post 62. The lower surface of the lower cam member 66 abuts against a shoulder 82 extending upwardly from the flange 60.

Thus it can be seen that, as the worm wheel 50 is rotated by the worm gear 48, the drive arm 22, the upper cam 64, and lower cam 66 are rotated therewith about the post portion 62 of the post member 58.

The post member 58 has an annular portion 84 which extends axially oppositely from the post portion 62 and is matably disposed within a bore 86 located in the base portion 33 of the housing 32. A bore 88 extends through the post portion 62, the flanged portion 60 and the annular portion 84 and slidably disposed therein is a locking and positioning shaft member 90.

The locking shaft member 90 has a pin member 92 secured within and extending from a radial bore 96. Rotatably secured at the outer extremity of the pin 92 is a roller member 98. The post portion 62 of the post member 58 has an axially extending slot 94 in one side thereof through which the pin 92 extends and on the opposite side of which is disposed the roller 98.

The upper cam member 64 has an upper cam surface 100 confronting a lower cam surface 102 on the lower cam member 66 and defines therewith an annular cam groove 104 substantially equal in width to the diameter of the roller member 98 which is matably disposed therein. A 360° development of the cam guide groove 104 is shown in FIGURE 7. The groove 104 has a cam portion 105 over a part of its circumference as shown to be bounded by the dimension X in FIGURE 7. The upper and lower cam members 64 and 66, respectively, are arranged relative to the drive arm 22 such that the roller 98 is located at the crest of cam portion 105 when the drive roller 20 is substantially at the midpoint of any of the arcuate surfaces 18 of the grooves 14. This relationship provides a result to be seen.

FIGURE 5 is a side elevational showing the roller 98 at the crest of the cam portion 105 in the groove 104. FIGURE 6 is a view taken at quadrature with respect to the view of FIGURE 5.

As previously mentioned, as the roller 20 moves along the arcuate surface 18, the roller 98 moves within the cam portion 105 of the groove 104 such that, upon reaching the crest or lobe, the roller 98 is in its uppermost axial position. Since the roller 98 is secured to the pin 92, which is, in turn, secured to the locking shaft 90, the locking shaft 90 at this time is also in its uppermost position. As previously noted, the axis 24 of the post portion 62, the bore 88, and thus of the locking shaft 90, is substantially in coincidence with the axis of the locking bore 26 when the drive roller 20 is in engagement with the arcuate surface 18. A bushing 106 is secured in each of the locking bores 26 and has a bore 108 which is substantially equal to the diameter of the upper end of the locking shaft 90 such that the locking shaft 90 can fit matably therein. The leading edge of the bore 108 and the leading edge of the shaft 90 are chamfered to compensate for any slight misalignment therebetween. With the roller 98 in its uppermost position and hence with the locking shaft 90 in its uppermost position, the locking shaft 90 is disposed within the bore 108 in the sleeve 106. By virtue of the chamfer on the leading edges of the locking shaft 90 and of the bore 108, as the locking shaft 90 is moved upwardly therein, any slight misalignment of the Geneva plate 12 is corrected and the Geneva plate 12 is finally located and locked in the desired position. As the worm wheel 50 is rotated further, the roller 98 is moved into the flat portion of the cam groove 104, thereby moving the roller 98 into its lowermost position thus causing the locking shaft 90 to be moved downwardly to its lowermost position and out of engagement with the bore 108 in the bushing 106. At this time the locking shaft 90 is in the position as shown in FIGURE 4; as the roller 20 is moved against the straight portion 16 of one of the grooves 14, the Geneva plate 12 is rotated in a clockwise direction to the next position. As previously mentioned, the drive means 30 can be allowed to operate continuously whereby the Geneva plate will be continuously indexed through its four positions or can be connected for intermittent operation, by means well known to the art, whereby the dwell time, with the roller 98 at its uppermost position, can be increased to any preselected length of time.

In order to provide for lubrication of the system, the housing 32 is partly filled with oil. The flanged portion 60 is provided with a plurality of grooves 110 on its bottom surface which communicate with the interior of the enclosed housing 32. An annular groove 112 is located in the internal surface of the bore 88 near the annular portion 84 and has located therein an O-ring member 114. A plurality of radially extending passages 116 interconnect the recesses 110 with the bore 88 through the groove 112. The O-ring 114 is of a size such that its inside diameter is in clearance relation with the outside diameter of the lower portion of the lock shaft 90. As the locking shaft 90 is moved to its uppermost position as shown in FIGURE 3, a slight vacuum is created in the lower portion of the bore 88, thereby drawing oil therein from the housing 32 through passages 116 past the O-ring 112.

At the bottom portion of the locking shaft 90 is located an axially extending bore 118 into which is pinned a hollow sleeve 120 by means of a radially extending pin 122. The sleeve 120 extends for only a portion of the depth of the bore 118 and forms at its upper end a seat for a ball 124. Sufficient clearance is provided between the upper portion of the ball and the uppermost extremity of the bore 118 to allow for upward movement of the ball 124 off from the seat provided by the sleeve 120. A pair of radially extending oil holes 126 extends through the locking shaft 90 and into communication with the upper end of the bore 118. The oil holes 126 in turn are in communication with an annular cavity 128 defined by the locking shaft 90 and by an enlarged diameter portion of the bore 88. The slot 94 opens into the cavity 128 and provides means whereby oil can be transmitted into the cam groove 104 to thereby provide lubrication between those moving parts. The cavity 128 is also in communication with a pair of connected passages 130 and 132 which extend through the upper end of the locking shaft 90 to thereby provide lubrication between the locking shaft 90 and the bushings 106. As the lock shaft 90 is moved to its unlocked position as shown in FIGURE 4, the oil in the bottom portion of the bore 88 is placed under pressure, thereby moving the O-ring 114 tightly against the annular groove 112, closing off the passageways 116 and preventing oil flow from the bore 88 back into the housing 32. At this time the ball 124 is forced from its seat on the sleeve 120 allowing oil to be forced through the passages 126 to thereby lubricate the components in the manner described. Thus each time the locking shaft 90 moves to its unlocked position the moving parts are lubricated.

With the construction as shown, it can be seen that the axis of the locking shaft 90 is coincident with the axis of rotation of the drive arm 22 thus facilitating the accurate location of the drive arm 22, and hence the drive roller 20 relative to the locking shaft 90. In other constructions, the locking mechanism is disposed at some position remote from the axis of the driving arm thus complicating the location of these parts relative to each other. Note that, by providing a compact mechanism as shown, Geneva plates of any size and having any number of indexing stations could be constructed still utilizing the basic components of the mechanism, thus providing for cost savings as a result of standardization of components. This also lends to the ease of replacement of worn or damaged parts. Note that the locking bushings 106 can be replaced if worn, thereby precluding the necessity of costly machining, etc.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. An indexing mechanism including a plate member secured for rotation about a first axis, groove means on said plate member for rotating said plate member about said first axis, drive arm means rotatable about a different axis and operatively connected with said groove means for rotating said plate member about said first axis and for positioning said plate member at preselected positions responsively to rotation of said drive arm means about said different axis, lock engaging means on said plate member allowing said plate member to be locked at said preselected positions, and lock means movable along said different axis and engageable with said lock engaging means for locking said plate member at said preselected positions.

2. The mechanism of claim 1 with said lock engaging means and said lock means including a shaft and a bore for matably receiving said shaft.

3. An indexing mechanism including a plate member secured for rotation about a first axis, groove means on said plate member for rotating said plate member about said first axis, drive arm means rotatable about a different axis and operatively connected with said groove means for rotating said plate member about said first axis and for positioning said plate member at preselected positions responsively to rotation of said drive arm means about said different axis, lock engaging means on said plate member allowing said plate member to be locked at said preselected positions, and lock means movable along said different axis and engageable with said lock engaging means for locking and for finally positioning said plate member at said preselected positions.

4. An indexing mechanism including a plate member secured for rotation about a first axis, groove means on said plate member for rotating said plate member about said first axis, drive arm means rotatable about a different axis and operatively connected with said groove means for rotating said plate member about said first axis and for positioning said plate member at preselected positions responsively to rotation of said drive arm means about said different axis, lock engaging means on said plate member allowing said plate member to be locked at said preselected positions, lock means movable along said different axis and engageable with said lock engaging means for locking said plate member at said preselected positions, and cam means rotatable about said different axis and operatively connected with said lock means for moving said lock means along said different axis and for engaging and disengaging said lock means with said lock engaging means responsively to rotation about said different axis.

5. An indexing mechanism including a plate member having a plurality of bores and secured for rotation about a first axis, groove means on said plate member for rotating said plate member about said first axis, drive arm means rotatable about a different axis and operatively connected with said groove means for rotating said plate member about said first axis and for positioning said plate member at preselected positions responsively to rotation of said drive arm means about said different axis, lock means for locking said plate member at said preselected positions, said lock means including a lock shaft secured for axial movement along said different axis and matably engageable with said bores for locking said plate member at said preselected positions.

6. The mechanism of claim 5 further including lubricating means for providing lubricant to parts of said mechanism responsively to movement of said lock shaft into and out of said bores.

7. An indexing mechanism including a plate member secured for rotation about a first axis and having a plurality of bores radially disposed about said first axis; groove means on said plate member for rotating said plate member about said first axis, drive arm means rotatable about a different axis and operatively connected with said groove means for rotating said plate member about said first axis and for consecutively positioning said plate member at preselected positions at which each of said bores is consecutively centered relative to said different axis responsively to rotation of said drive arm means about said different axis, lock means for locking and for finally positioning said plate member at said preselected positions, said lock means including a lock shaft secured for axial movement along said different axis and matably engageable with said bores for locking said plate member at said preselected positions.

8. An indexing mechanism including a plate member secured for rotation about a first axis and having a plurality of bores radially disposed about said first axis; groove means on said plate member for rotating said plate member about said first axis, drive arm means rotatable about a different axis and operatively connected with said groove means for rotating said plate member about said first axis and for consecutively positioning said plate member at preselected positions at which each of said bores is consecutively centered relative to said different axis responsively to rotation of said drive arm means about said different axis, lock means for locking and for finally positioning said plate member at said preselected positions, said lock means including a lock shaft secured for axial movement along said different axis and matably engageable with said bores for locking said plate member at said preselected positions, and cam means rotatable about said different axis and operatively connected with said lock means for moving said lock means along said different axis and for engaging and disengaging said lock means with said lock engaging means responsively to rotation about said different axis.

9. The mechanism of claim 8 in which said lock means further includes a cam follower member secured to and extending radially from said lock shaft and in which said cam means includes an upper and lower cam member secured together for rotation about said different axis and defining a radial cam groove for receiving said cam follower member whereby rotation of said cam member about said different axis causes axial movement of said cam follower member and hence of said lock shaft along said different axis.

10. An indexing mechansim including a plate member secured for rotation about a first axis and having a plurality of bores radially disposed about said first axis and having a plurality of radially extending straight groove portions disposed at equal angular intervals about said first axis, a drive arm rotatable about a different axis, a drive roller rotatably secured to said drive arm at a point removed from said different axis and successively engageable with successive ones of said straight groove portions for intermittently rotating said plate member to preselected positions responsively to rotation of said drive arm about said different axis, lock means for locking and for finally positioning said plate member at said preselected positions, said lock means including a lock shaft secured for axial movement along said different axis and matably engageable with said bores for locking said plate member at said preselected positions and cam means responsive to rotation about said different axis for moving said lock shaft into and out of said bores in said plate member during intervals when said drive roller is out of said straight groove portions.

11. The mechanism of claim 10 in which said lock means further includes a cam follower member secured to and extending radially from said lock shaft and in which said cam means includes an upper and lower cam member secured together for rotation about said different axis and defining a radial cam groove for receiving said cam follower member, said cam groove having a crest portion for moving said cam follower in a direction to engage said lock shaft in said bores with said crest portion engaging said cam follower member only during intervals when said drive roller is out of said straight groove portions.

12. An indexing mechanism including a plate member secured for rotation about a first axis and having a plurality of bores radially disposed about said first axis at equal angular intervals, said plate member having a plurality of radially extending straight groove portions disposed at equal angular intervals about said first axis with adjacent ones of said straight groove portions interconnected at their radially innermost ends by an arcuate portion, a drive arm rotatable about a different axis, a drive roller rotatably secured to said drive arm at a point removed from said different axis and successively engageable with successive ones of said straight groove portions for intermittently rotating said plate member to preselected positions at which each of said bores is consecutively centered relative to said different axis responsively to rotation of said drive arm about said different axis, lock means for locking and for finally positioning said plate member at said preselected positions, said lock means including a lock shaft secured for axial movement along said different axis and matably engageable with said bores for locking said plate member at said preselected positions and cam means rotatable about said different axis for moving said lock shaft into and out of said bores in said plate during intervals when said drive roller is on said arcuate portion, said lock means further including a cam follower member secured to and extending radially from said lock shaft, said cam means including an upper and lower cam member secured together for rotation about said different axis and defining a radial cam groove for receiving said cam follower member, said cam groove having a crest portion for moving said cam follower in a direction to engage said lock shaft in said bores with said crest portion engaging said cam follower member only during intervals when said drive roller is on said arcuate portion.

13. An indexing mechanism including a plate member secured for rotation about a first axis and having a plurality of bores radially disposed about said first axis at equal angular intervals, said plate member having a plurality of radially extending straight groove portions disposed at equal angular intervals about said first axis, a drive arm rotatable about a different axis, a drive roller rotatably secured to said drive arm at a point removed from said different axis and successively engageable with successive ones of said straight groove portions for intermittently rotating said plate member to preselected positions at which each of said bores is consecutively centered relative to said different axis responsively to rotation of said drive arm about said different axis, lock means for locking and for finally positioning said plate member at said preselected positions, said lock means including a lock shaft secured for axial movement along said different axis and matably engageable with each of said bores for locking and for finally positioning said plate member at said preselected positions, cam means rotatable about said different axis for moving said lock shaft into and out of said bores in said plate during intervals when said drive roller is out of said straight groove portions, said lock means further including a cam follower member secured to and extending radially from said lock shaft, said cam means including an upper and lower cam member secured together for rotation about said different axis and defining a radial cam groove for receiving said cam follower member, said cam groove having a crest portion for moving said cam follower in a direction to engage said lock shaft in each of said bores with said crest portion engaging said cam follower member only during intervals when said drive roller is out of said straight groove portions, a gear member secured to said cam means for rotation about said different axis, and motor means for rotating said gear member about said different axis.

14. An indexing mechanism including a plate member secured for rotation about a first axis and having a plurality of bores radially disposed about said first axis at equal angular intervals, said plate member having a plurality of radially extending straight groove portions disposed at equal angular intervals about said first axis, a drive arm rotatable about a different axis, a drive roller rotatably secured to said drive arm at a point removed from said different axis and successively engageable with successive ones of said straight groove portions for intermittently rotating said plate member to preselected positions at which each of said bores is consecutively centered relative to said different axis responsively to rotation of said drive arm about said different axis, lock means for locking and for finally positioning said plate member at said preselected positions, said lock means including a lock shaft secured for axial movement along said different axis and matably engageable with each of said bores for locking and for finally positioning said plate member at said preselected positions, cam means rotatable about said different axis for moving said lock shaft into and out of said bores in said plate during intervals when said drive roller is out of said straight groove portions, said lock means further including a cam follower member secured to and extending radially from said lock shaft, said cam means including an upper and lower cam member secured together for rotation about said different axis and defining a radial cam groove for receiving said cam follower member, said cam groove having a crest portion for moving said cam follower in a direction to engage said lock shaft in each of said bores with said crest portion engaging said cam follower member only during intervals when said drive roller is out of said straight groove portions, a gear member secured to said cam means for rotation about said different axis, motor means for rotating said gear member about said different axis, said drive arm, said lock means and said cam means located within a closed housing for holding a lubricant, said lock shaft having its lower end movable into and out of a cavity partially defined by a bore, an O-ring disposed in an annular groove in said bore, passages communicating said cavity with said housing through said annular groove, passage means fluid communicating said cavity with parts of said mechanism to be lubricated, and ball valve means located in said cavity for blocking said cavity from said passage means during axially upward movement of said lock shaft and for moving out of blocking relationship upon axially downward movement of said lock shaft.

15. An indexing mechanism including a plate member secured for rotation about a first axis and having a plurality of bores radially disposed about said first axis at equal angular intervals, said plate member having a plurality of radially extending straight groove portions disposed at equal angular intervals about said first axis with adjacent ones of said straight groove portions interconnected at their radially innermost ends by an arcuate portion, a drive arm rotatable about a different axis, a drive roller rotatably secured to said drive arm at a point removed from said different axis and successively engageable with successive ones of said straight groove portions for intermittently rotating said plate member to preselected positions at which each of said bores is consecutively centered relative to said different axis responsively to rotation of said drive arm about said different axis, lock means for locking and for finally positioning said plate member at said preselected positions, said lock means including a lock shaft secured for axial movement along said different axis and matably engageable with each of said bores for locking and for finally positioning said plate member at said preselected positions, cam means rotatable about said different axis for moving said lock shaft into and out of said bores in said plate during intervals when said drive roller is on said arcuate portion, said lock means further including a cam follower member secured to and extending radially from said lock shaft, said cam means including an upper and lower cam member secured together for rotation about said different axis and defining a radial cam groove for receiving said cam follower member, said cam groove having a crest portion for moving said cam follower in a direction to engage said lock shaft in said bores with said crest portion engaging said cam follower member only during intervals when said drive roller is on said arcuate portion, said drive arm, said lock means and said cam means located within a closed housing for holding a lubricant, said lock shaft having its lower end movable into and out of a cavity partially defined by a bore, an O-ring disposed in an annular groove in said bore, passages communicating said cavity with said housing through said annular groove, passage means fluid communicating said cavity with parts of said mechanism to be lubricated, ball valve means located in said cavity for blocking said cavity from said passage means during axially upward movement of said lock shaft and for moving out of blocking relationship upon axially downward movement of said lock shaft, a gear member secured to said cam means for rotation about said different axis, and motor means for rotating said gear member about said different axis.

References Cited in the file of this patent
UNITED STATES PATENTS

| | | |
|---|---|---|
| 1,975,005 | Kingsbury et al. | Sept. 25, 1934 |
| 2,086,848 | Bullard | July 13, 1937 |
| 2,373,796 | Weidaner | Apr. 17, 1945 |
| 2,784,599 | Moulin | Mar. 12, 1957 |
| 3,049,017 | McDonald | Aug. 14, 1962 |